United States Patent [19]
Stephan, deceased et al.

[11] 3,709,623
[45] Jan. 9, 1973

[54] COMBINED BORING, DRILLING AND MILLING MACHINE

[75] Inventors: Hallis N. Stephan, deceased, late of Cleveland, Ohio; Katharine S. Stephan, executrix, Cleveland Heights, Ohio; Leslie C. Seager, Memphis, Tenn.

[73] Assignee: The New Britain Machine Company, New Britain, Conn.

[22] Filed: June 15, 1970

[21] Appl. No.: 46,401

Related U.S. Application Data

[63] Continuation of Ser. No. 25,118, April 27, 1960, abandoned.

[52] U.S. Cl. .......................... 408/22, 29/26 A, 29/568
[51] Int. Cl. .............................................. B23q 3/157
[58] Field of Search ..... 29/568, 26; 82/28.2; 90/11.1; 77/3, 4, 25; 408/22

[56] References Cited

UNITED STATES PATENTS

| | | | |
|---|---|---|---|
| 3,412,459 | 11/1968 | Hollis | 29/568 |
| R25,812 | 6/1965 | Morgan | 29/568 |
| 3,028,770 | 4/1962 | Pittwood | 77/4 |
| 2,945,401 | 7/1960 | Howey et al. | 77/3 |

Primary Examiner—Andrew R. Juhasz
Assistant Examiner—Z. R. Bilinsky
Attorney—Alan C. Rose, Alfred B. Levine and Joseph R. Spalla

[57] ABSTRACT

A machine tool having a vertically movable spindlehead provided with an extensible and retractable power-driven rotatable tool spindle including spring-biased mechanism for securing a tool member in the extensible end thereof releasable by a fluid pressure motor, a work-supporting compound slide assembly having two slide members movable in directions at right angles to one another in horizontal planes, all being selectively movable in opposite directions along their respective paths of movement, a tool magazine on the top slide of the work-supporting compound slide for holding a plurality of tool members in predetermined angular positions, means for stopping the spindle in a predetermined angular position upon discontinuation of its rotation and numerical control for affecting operation of the machine to perform a machining operation on work with at least two different tool members automatically transferring a previously used tool from the tool spindle to the magazine and a new tool from the magazine to the tool spindle.

23 Claims, 9 Drawing Figures 3,709,623

COMBINED BORING, DRILLING AND MILLING MACHINE

RELATED CASES

This application is a continuation of application, Ser. No. 25,118, filed Apr. 27, 1960, entitled Combined Boring, Drilling and Milling Machine and now abandoned. The subject matter of the aforesaid application is included herein by reference.

FIELD OF THE INVENTION

The invention relates to machine tools having a rotatable tool spindle and especially to machine tools of the type where it is advantageous to reinsert the tool member in the tool spindle in the same angular position it previously occupied therein, and more particularly to combined boring, drilling and milling machines.

DESCRIPTION OF PRIOR ART

Prior to the present invention machine tools having rotatable tool spindles and mechanisms which automatically interchanged a tool member in the tool spindle with one in a tool member storage magazine were known but the tool members were inserted in the tool spindle in random relative angular positions.

SUMMARY OF THE INVENTION

The invention provides a machine tool comprising a movable spindlehead having an extensible and retractable power-driven tool spindle and releasable mechanism for securing a tool member in its extensible end, means for stopping the tool spindle in a predetermined angular position upon discontinuation of its rotation, and a work-supporting compound slide assembly all selectively operable under numerical control, and means mechanically inserting a tool member in said tool spindle in predetermined angular position with respect to the tool spindle.

In the preferred embodiment the invention further provides a novel and improved machine tool comprising a rotatable tool carrying member and a work carrying member movable relative to one another both transversely of the axis of rotation of the tool carrying member and lengthwise of said axis in combination with means for automatically moving the members to perform a series of machining operations on one or more work pieces supported on the work carrying member and including the changing of the tool carried by the tool carrying member between two such operations. The invention further provides a novel and improved combined boring, drilling and milling machine comprising an axially movable rotatable tool carrying spindle member supported in a spindlehead slide member reciprocable in a path transversely of the axis of rotation of the spindle member and a work carrying slide member supported for movement transversely of the path in which the spindlehead slide member is reciprocable in combination with means for automatically effecting relative movement between the members to perform a series of machine operations on one or more work pieces carried by the work carrying slide member and means for changing the tool carried by the tool carrying spindle member between two machining operations when desired.

The invention resides in certain constructions and combinations and arrangements of parts and further objects and advantages thereof will be apparent to those skilled in the art to which it relates from the following description of the preferred embodiment described with reference to the accompanying drawings forming a part of this specification, and in which similar reference characters designate corresponding parts.

DESCRIPTION OF PREFERRED EMBODIMENT

Figure 1:
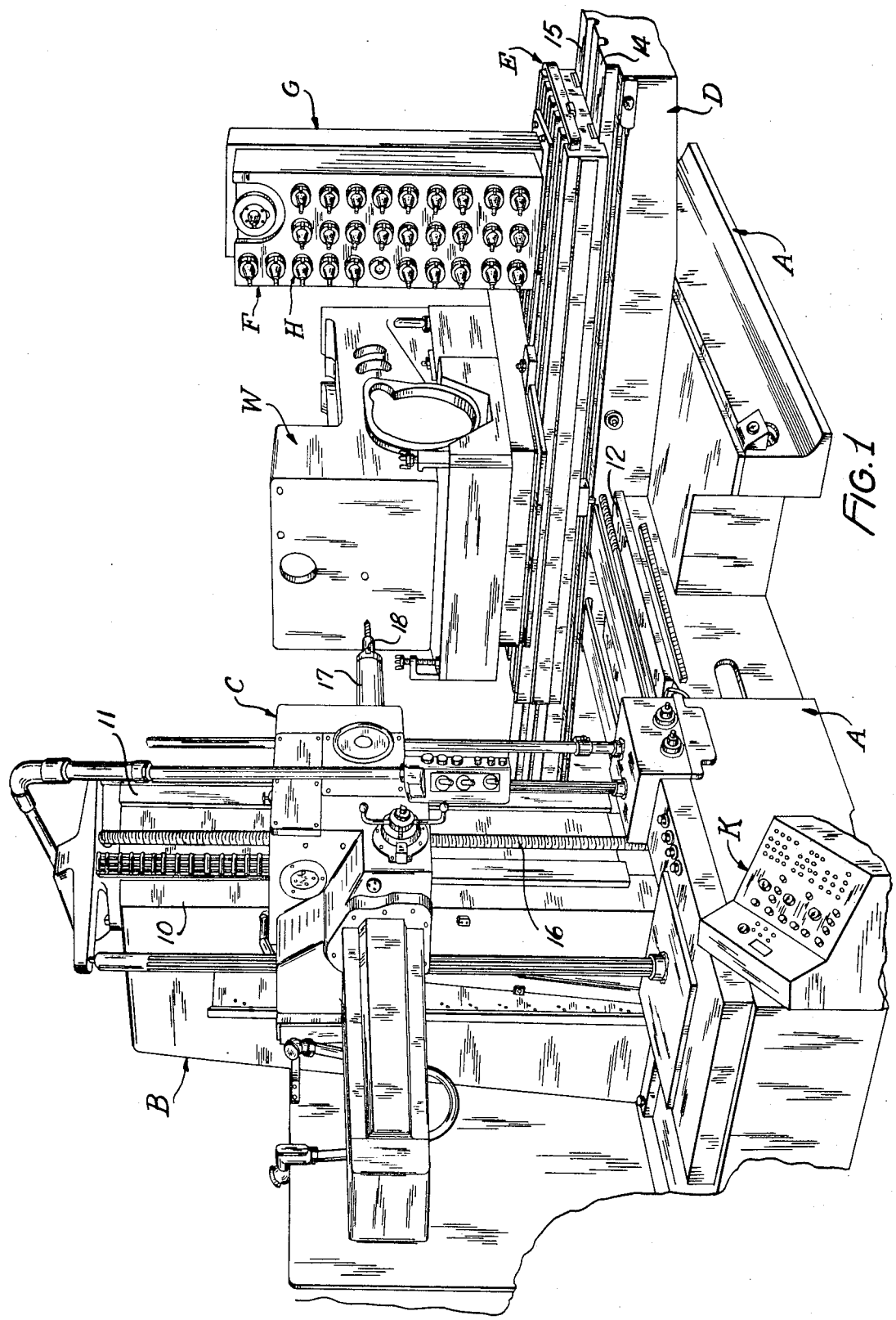
FIG. 1 is a perspective view of a horizontal boring, drilling and milling machine embodying the present invention.

Referring to the drawings of the machine shown therein, except for certain differences hereinafter pointed out, is a commercially available automatic punched tape controlled horizontal boring, drilling and milling machine manufactured and sold by the Assignee of the present invention and only those parts of the machine which are necessary to understand the resent invention are herein shown and described in detail.

Generally speaking the machine shown is similar to the machine which forms the preferred embodiment of Stephan U.S. Pat. No. 2,860,547, and comprises a bed or base A, provided at one end with a column B having vertical ways 10 and 11 on its front side upon which a spindlehead or slide member C is supported for vertical movement, a saddle or slide member D supported on two or more horizontal ways 12 formed on the upper side of the bed or base A for movement towards and from the column B and a work table or work carrying slide member E supported on horizontal ways 14 and 15 on the upper side of the saddle D for movement transversely of the bed A.

The spindlehead C is adapted to be moved vertically along the ways 10 and 11 by a lead screw 16 rotatably supported in the base of the machine and having threaded engagement with a nut fixed in the spindlehead. The spindlehead C includes a rotatable horizontal tool-carrying member or tool spindle 17 which in addition to being rotatable in opposite directions, is movable in opposite directions longitudinally of its axis of rotation at different speeds to effect both feed and rapid or transverse movements of the tool carried thereby. The saddle D is movable in opposite directions longitudinally of the axis of rotation of the tool spindle along the ways 12 and the table E is movable in opposite directions transversely of the axis of rotation of the tool spindle along the ways 14 and 15 at different speeds to effect both feed and rapid or transverse movements by suitable mechanism, such as conventional lead screws rotatably supported in the base A and the saddle E and being in threaded engagement with a nut on the underside of the saddle D on the table E, respectively.

In the normal operation of the machine the foregoing movements are effected by power and for this purpose the machine illustrated includes a reversible electric motor, generally referred to as the "spindle drive" motor, enclosed within the left-hand end of the base of the machine for effecting the spindle rotation and spindle feed movements. A reversible spindle rapid traverse electric motor mounted on the spindlehead C, generally referred to as the "spindle traverse" motor and discrete multispeed reversible electric motors, generally referred to as "feed" motors for effecting the feed and rapid or traverse movements of the spindlehead, saddle and table. Other motors are employed but their location and operation are not necessary to an understanding of the present invention.

The speed and direction of rotation of the spindle, and the speed and direction of movement of the other various machine tool elements, such as the feed and traverse movements of the spindle, spindlehead, saddle and table are controlled by a commercially available punched tape control unit K located at a convenient place about the machine. The machine will automatically perform any desired cycle of operations within its capacity in response to information placed on the tape.

The present invention contemplates extending the capacity of machines of the character referred to and machine tools generally, beyond those of merely performing predetermined cycles of machining operations utilizing a single tool, to include the performing of such cycles utilizing different tools with the tool selection and changing functions being performed automatically in response to information on the tape or cards.

Referring again to the drawings, the machine illustrated comprises a tool rack G detachably connected to the upper right-hand front corner of the table E, as the machine is viewed in FIG. 1, which tool rack includes a tool magazine F provided with a plurality of tool holding devices H, each of which has a tool T therein with the exception of the sixth device from the bottom in the left-hand row. The tool, which in the embodiment shown, is normally positioned in this device is in the spindle 17 in position to drill a hole in a workpiece W carried by the table E and connected to the upper side thereof in a position offset rearwardly from the tool rack G.

According to the provisions of the present invention after the required or desired machining operation or operations to be performed by the tool in the tool carrier or spindle have been completed and with the tool and work separated to permit relative movement therebetween transversely of the axis of the spindle, the spindlehead and table are automatically moved to align the spindle with the tool holding device H in the tool magazine F in which the tool in the spindle is normally positioned. After the spindle has been so aligned it is extended, that is, moved in a forward direction, to locate the tool therein in the tool holding device in which it belongs in the tool magazine F whereupon the clamp or tool grab means in the tool spindle is actuated to release the tool and the spindle retracted.

With no tool in the spindle the spindlehead C and/or table E are moved to align the tool spindle 17 with any desired tool in the magazine F whereupon the spindle is extended to engage the selected tool and the clamp mechanism in the spindle actuated to clamp or grab the tool. The tool spindle is subsequently retracted and the spindlehead C and table E moved relative to one another to align the tool spindle with a position on the work at which a subsequent machining operation is to be performed. After the desired machining operation or operations are performed by the tool then in the spindle the cycle of returning the tool to the magazine F and picking up another tool is repeated until all of the machining operations to be performed upon the work W are completed whereupon the last tool used is returned to the magazine F and the machine automatically stopped.

The tool chucking or drawback and ejecting mechanism in the spindle 17 is power-operated and may be similar to that disclosed in Stephan U.S. Pat. No. 2,860,547. It is also to be understood that the relative movements between the projecting end of the tool spindle and the worktable axially of the spindle may be accomplished either by reciprocation of the saddle D or by extending and retracting the spindle, the latter, however, is preferred as is well understood in the art.

The parts, heretofore referred to as tools, are in fact tool arbors having tools proper detachably connected therewith and each is provided with one or more keys 18 adapted to fit in keyways 19 in the projecting end of the spindle 17. In order for the keys to properly engage the keyway in the tool spindle when the tools are picked up by the tool spindle and to repeatedly replace each tool in the tool spindle in the same position, a feature of the present invention, the tools are always placed in the tool holding devices H of the tool magazine F with the keys in the same angular position and upon each stopping of the tool spindle preparatory to the depositing of a tool in a tool holding device of tool magazine or the picking up of a tool in the tool magazine the spindle is stopped in the same angular position.

The tool chucking or drawback and ejecting mechanism in the spindle 17 is power-operated and that shown is similar to that disclosed in the aforesaid Stephan U.S. Pat. No. 2,860,547. Referring to FIGS. 5–9, the spindle 17 is provided with an axially extending aperture, the forward portion of which aperture forms a tapered socket 130 fashioned to receive the tools or more correctly the tool arbors. The socket 130 terminates in a cylindrical bore 131 the diameter of which, in the preferred embodiment, is about one-third that of the spindle, and the bore 131, in turn, communicates with an axial bore 133 extending to the rear end of the spindle. The portion of the bore 133 adjacent to the rear end of the spindle is counterbored as at 134. The socket 130 and bore 131 are adapted to receive the tool arbors, the taper of the shanks 135 of which correspond to the taper of the socket 130, and the rear cylindrical portions or pilots 136 of which fits into the bore 131 and are provided with conventional tapped or threaded holes 137 into each of which an adapter or lock plug 138 is threaded until a flange 139 formed thereon abuts against the rearward end of the arbor in which the plug is threaded. Alternatively, the so-called adapters 138 could be formed integrally with the arbors.

To the left of the flange 139, as viewed in the drawings, each of the adapters 138 is provided with a head 140 connected to the flange portion 139 thereof by a reduced portion or neck 141. The portion of the head 140 adjacent to the neck 141 is frusto-conical in configuration and provides a conical surface 142 diverging rearwardly with respect to the axis of the spindle, which surface is adapted to be engaged by a mechanism for binding or locking the arbor in the spindle socket.

The mechanism shown for locking or binding the arbors in the socket 130 comprises a collet 144 positioned within the bore 131 and threaded onto the forward end of a drawbar 145 extending from the bore 131 through the bore 133 and into the counterbore 134. Reciprocation of the drawbar 145 will move the collet 144 axially in the bore 131.

The collet 144 includes a plurality of spring or resilient fingers 146 each having an outer end or wedge portion 147 provided with an inner inclined surface 148 and an outer inclined surface 149. The inner surface 148 of each wedge portion 147 is inclined with respect to the spindle axis so as to diverge rearwardly from the axis of the spindle and is adapted to engage the rearwardly diverging surface 142 on the adapter 138 when the collet 144 is in its binding or locking position. The outer inclined surface 149 of each finger also diverges rearwardly and engages an annular rearwardly diverging abutment surface 150 on a flange 151 extending inwardly from the inner wall of a bushing 152 fixed within the bore 131 of the spindle.

The abutment surface 150 diverges rearwardly with respect to the axis of the spindle with its acute angle of inclination preferably being less than the acute angle of inclination of the surface 142 of the adapter. The inner surfaces 148 and outer surfaces 149 of the wedge portions 147 have, in the illustrated embodiment, the same angle of inclination as the surfaces 142, 150, respectively. In the binding position of the collet the portion 147 of each of the fingers 146 acts as a wedge, preferably a locking wedge, operating between the fixed abutment surface 150 carried by the spindle and the inclined surface 142 of the adapter 138.

Figure 5:
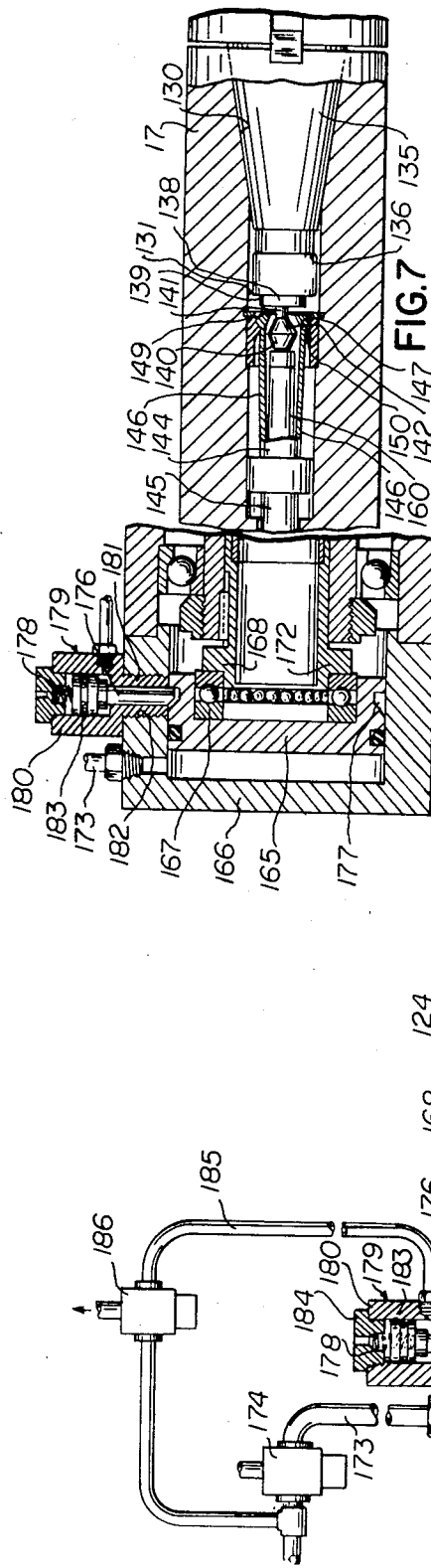
FIG. 5 is a sectional view of the tool spindle with portions shown in elevation.

The collet 144, in the illustrated embodiment, is continuously urged to a retracted or wedging position, shown in FIG. 5, wherein it is adapted to lock an arbor in the spindle socket by a spring 156 positioned in the bore 134 at the rear of the spindle. The spring 156 is interposed between a cylindrical member 157 fixed to the end of the drawbar 145 and a shoulder 158 formed by the bottom of the counterbore 134.

Figure 6:
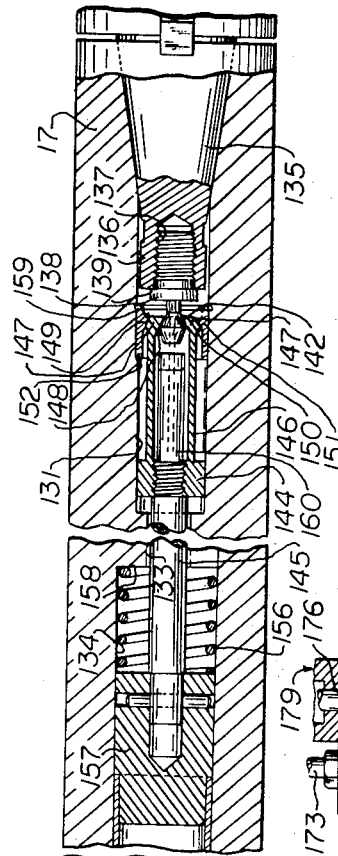
FIGS. 6 and 7 are sectional views similar to FIG. 5, but showing the collet and actuating mechanism therefor in different positions.

To release an arbor from the spindle socket 130, the collet 144 is moved forwardly in the bore 131 to move the wedge portions 147 of the fingers 146 from between the fixed inclined surface 150 of the spindle and the inclined surface 142 of the adapter 138 and to position the wedge portions 147 in the bore 131 forwardly of the shoulder 159 forming the forward or right-hand side of the internal flange 151 upon which the inclined surface 150 is formed. With the wedge portions 147 of the fingers 140 forward of the shoulder 159, the fingers 146 will expand when the arbor is moved outwardly and permit the withdrawal of the arbor from the spindle socket. As the collet 144 is moved forwardly by the drawbar 145 the forward portion 160 of the drawbar 145 functions as an ejector or abutment member and strikes the rear or left-hand end of the adapter 138 to unseat the arbor from the socket 130, as shown in FIG. 6. The movement of the ejector 160, after it engages the end of the adapter 138, need only be sufficient to break the arbor away from its seat in the socket 130. Preferably the inherent resiliency of the fingers 146 urge them into engagement with adapter 138 so that the arbor will be held by the fingers 146 after it is unseated from the socket 130. Movement of the arbor outwardly from the spindle socket will cause the fingers 146 to expand and release the arbor.

In the illustrated embodiment, the collet 144 is moved forwardly with respect to the spindle 17 from its rearward locking or binding position in bore 131 to its forward releasing-and-ejecting position by a hydraulic reciprocating-type motor having a piston 165 slidable in a cylinder 166 fixed to a spindle slide 124 adjacent to the rearward end of the spindle, the piston and the cylinder being coaxial with the spindle. The piston 165 is operatively connected to the cylindrical member 157 fixed to the rearward end of drawbar 145 by a thrust bearing 167 supported on the rearward end of a sleeve 168 slidably keyed in the counterbore 134 adjacent to the rearward end thereof and fixedly connected to the cylindrical member 157 by a tube 170 in the counterbore 134. The thrust bearing 167 is supported within the skirt 171 of piston 165 and bears against a shoulder formed by an external flange 172 on the end of the sleeve 168 projecting from the counterbore 134 of the spindle 17. The thrust bearing 167 permits the sleeve 168 to rotate with the spindle without rotating the piston 165 but transmits the axial movement of the piston to the sleeve 168, drawbar 145, etc. Conversely, the thrust bearing 167 transmits the axial movement of the drawbar and sleeve to the piston.

Fluid pressure for moving the piston 165 in a forward direction is supplied to the cylinder 166 through a fluid pressure supply line 173 including a solenoid valve 174 for controlling the flow of fluid pressure to and from the cylinder 166. When the valve is de-energized, the supply of pressure fluid to cylinder 166 is disconnected and the cylinder is connected to drain. Upon energization of the solenoid valve, it is moved to a position which closes the drain and permits the flow of pressure fluid to the cylinder 166. The fluid pressure applied to the piston 165 must be sufficient to overcome the action of spring 156 which continually urges the collet 144 and the drawbar 145 in a rearward direction.

Figure 7:
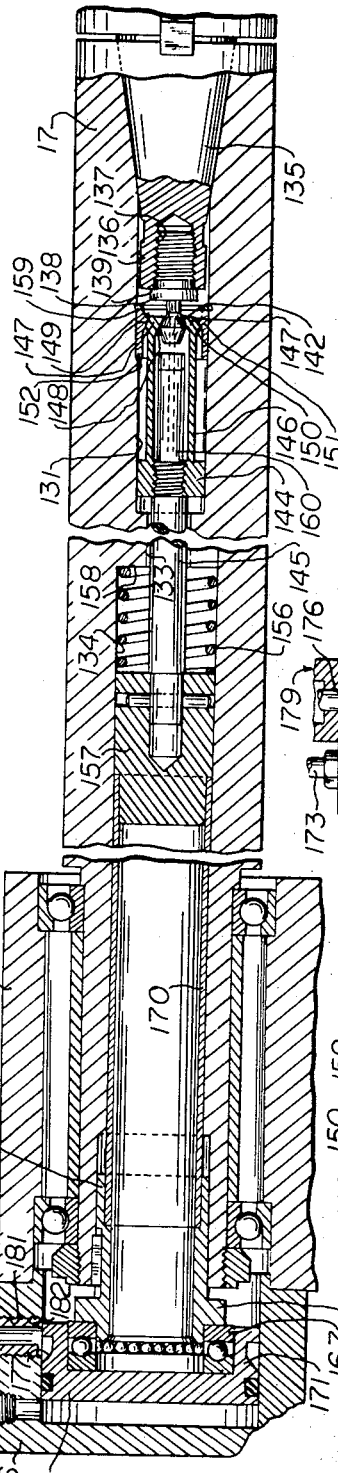
Figure 8:
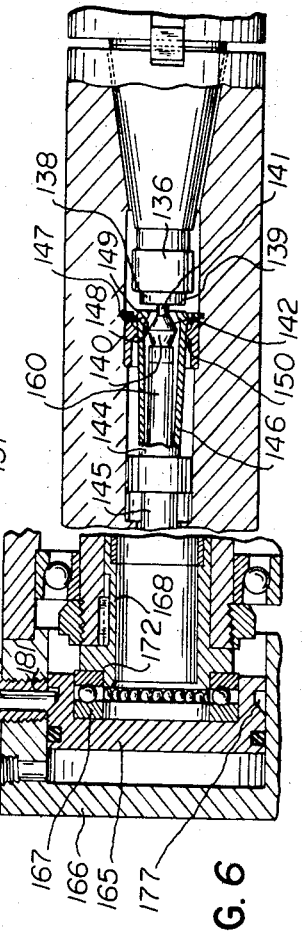
FIG. 8 is an enlarged fragmentary view showing the collet in binding position.

When the spindle 17 does not have an arbor secured thereto, it is desirable to maintain the locking or binding mechanism or more particularly the wedging portion 147 of the collet fingers 146, in a forward position ready to receive an arbor inserted into the socket 130, as shown in FIG. 7. In the illustrated embodiment, the collet 144 is held in an arbor receiving position against the action of the spring 156 upon the release of the fluid pressure in cylinder 166 by a radially extending detent pin 176 carried by the cylinder 166, the inner end of which pin is adapted to engage in an annular groove 177 in the skirt 171 of the piston 165 when the piston is adjacent to the forward end of its stroke. The detent pin 176 is biased by a spring 178 toward its engaged position and power actuated to its released position by a fluid pressure motor designated generally by the reference numeral 179. The detent pin 176 is slidably supported in the cylinder member 180 of the fluid pressure motor 179 which cylinder member includes a threaded boss 181 extending radially inwardly through an opening 182 in the cylinder 166. When the collet 144 is in its rearward position, that is in the position in which it locks or binds an arbor in the spindle socket, the piston 165 will be in its rearward position and the detent pin 176 will merely engage the side of the piston skirt 171 forwardly of the annular groove 177 in the skirt 171 of the piston. Upon forward movement of the piston 165, the detent pin drops into the annular groove 177 due to the bias of the spring 178. The rearward sides of the annular groove 177 and the detent pin are sloped so that the engagement of detent pin 176 in the groove 177 will not stop the forward movement of the piston, the extent of the forward movement being determined by the engagement of the flange 172 of sleeve 168 with the rearward end of the spindle 17. The forward side of the groove 177, however, extends radially, and when the fluid pressure in the cylinder 166 is released, will engage the detent pin 176 upon rearward movement of the piston a predetermined distance from its forward position as will appear hereinafter.

The radially outer end of detent pin 176 is connected to a piston 183 slidable in a suitable bore in the cylinder member 180. The outer end of the cylinder member 180 is closed by a plug 184, and the spring 178 for urging the detent pin 176 towards the piston skirt 171 is interposed between the plug 184 and the piston 183. Fluid pressure is supplied to the cylinder member 180 to move the detent pin 176 in a direction away from the piston 165, that is in a direction to release the latching action of the detent pin 176, by a conduit 185 connected thereto and to a solenoid valve 186 which controls the application of the fluid pressure to the motor 179 and its exhaust therefrom. The valve 186 is normally in a position to connect the motor 179 to exhaust. When energized, the valve is actuated to a position to permit the flow of pressure fluid to motor 179, and upon application of fluid pressure to the motor 179, the piston 183 moves against the action of spring 178 and the detent pin 176 is withdrawn from the annular groove 177 permitting the spring 156 to move the collet 144 to its rearward locking or binding position.

It has been found that the seating of the arbor and the proper binding action of the wedge portions 147 are facilitated if the collet 144 and the arbor ejecting portion 160 of the drawbar 145 is retracted sufficiently to permit the full seating of the arbor in the arbor socket prior to wedging the portions 147 between the adapter 138 and the fixed surface 150 within the spindle. The latching mechanism, comprising the detent pin 176 and the groove 177 in the cylinder is so constructed and arranged that when the collet 144 is being held in a forward position by the detent pin 176 the ejector 160 is retracted just far enough to allow the arbor to be firmly seated in the socket 130, as shown in FIG. 7, but not far enough for the collet fingers 146 to be moved inwardly a sufficient distance for flange 151 to prevent the insertion of the inner end of the adapter 138 into the collet. After the arbor has been inserted and seated in the socket, the power actuated detent 176 may be released and the spring 156 allowed to move the collet 144 to engage the wedge portions 147 of the fingers 146 between the inclined surfaces on the spindle and adapter. The forward side of flange 151 and the abutment at the rearward end of the inclined surfaces 149 of the wedge portions 147 of fingers 146 are shaped so as not to prevent the rearward movement of the collet 144 to its arbor locking or binding position. When the detent pin 176 is withdrawn from the groove 177 in the skirt 171 of the piston, the spring 156 draws the collet 144 and the wedge portions 147 of the fingers 146 thereof into binding position with a hammer-like action which securely forces the arbor into the socket and effects a secure binding thereof.

In the illustrated embodiment, the inner inclined surface 148 and the outer inclined surface 149 of the wedge portions 147 have been shown and described as having rearward diverging inclinations of different magnitudes with respect to the axis of the spindle 17. As hereinbefore mentioned, the fixed abutment surface 150 and the conical surface 142 on the adapter 138 will normally have the same inclination as the respective engaging surfaces of the fingers 146. Preferably, the inclination of the inner surface of the wedge portions 147 is approximately 30° and the inclination of the outer surfaces of the wedge portions 147 approximately 20° with respect to the spindle axis. With inclinations of this order of magnitude, no difficulty has been encountered in clamping and releasing the binding mechanism.

The operation of the illustrated mechanism for binding and securing an arbor in the tool spindle 17 may be summarized as follows. When no arbor is positioned in the spindle socket 130, the collet mechanism for securing an arbor in the spindle is maintained in the position illustrated in FIG. 7 with wedge portions 147 of the collet 144 positioned just forwardly of the flange 151, the collet being held in this position by the detent pin 176 which is in engagement with the forward side of the annular groove 177. Subsequent to insertion of an arbor into the socket 130 and the seating of the arbor against the side wall of the socket, valve 186 is actuated to supply fluid pressure to hydraulic motor 179 through supply line 184 causing the piston 183 to move in a direction to withdraw the detent pin 176 from the annular groove 177. When the detent pin 176 is withdrawn from the groove 177, the spring 156 moves the collet 144 and the piston 165 of the cylinder 166 in a rearward direction. Movement of the collet 144 in a rearward direction causes the fingers 146 to move inwardly toward the reduced or neck portion of the adapter 138 permitting the wedge portions 147 to move past the shoulder 159. Continued rearward movement of the collet 144 causes the wedge portions 147 to wedge themselves between the fixed inclined abutment surface 150 and the conical surface 142 on the adapter 138. The collet 144 is held in its rearward position, shown in FIG. 5 with the finger portions 147 wedged between the abutment surface 150 and the adapter 138 by the action of spring 156 and any force tending to move the arbor axially in an outward direction and tending to unseat the arbor will merely increase the wedging action of the finger portions 147 and create a reactive force in the abutment surface 150 tending to move the arbor in a seating direction.

To release the arbor from the socket 130 the solenoid valve 174 is activated to supply fluid pressure to the hydraulic cylinder 166 through fluid supply line 173. The fluid pressure supplied to the cylinder 166 will move the piston 165 forwardly, which, in turn, moves the collet 144 forwardly to remove the wedge portions 147 of the fingers 146 from their binding and locking position intermediate the fixed abutment surface 150 and the surface 142 on the adapter 138. The releasing of the wedge portions 147 of the fingers 146 is facilitated by the difference in inclination of the surface 150 of the flange 151 and the surface 142 of the adapter. The surface 142 has a greater inclination with respect to the axis of the spindle and permits the wedge portions 147 to move downwardly away from the abutment surface 150 as the collet 144 is moved forwardly. Continued forward movement of the collet 144 allows the shoulders formed at the rearward ends of the outer inclined surfaces 149 to clear the annular shoulder 159, at which time the fingers 146 will move radially outwardly of the spindle as a result of their inherent resilient characteristics.

After the wedge portions 147 have cleared the shoulder 159 at the forward end of the abutment surface 150, the ejector 160 will strike the rearward end of the adapter 138 and additional forward movement of the collet 144 to the position of FIG. 6 will unseat the arbor from the socket 130, thereby facilitating the removal of the arbor. After the arbor has been removed, the solenoid valve 174 is de-energized, releasing the pressure applied to the piston 165 and permitting the spring 156 to move the collet rearwardly until the detent pin 176 engages the forward side of the annular groove 177 to prevent further rearward movement. Upon engagement of the detent pin 176, the collet mechanism is held in a position to again receive an arbor to be secured in the spindle socket, the mechanism being so positioned that the arbor may be completely seated in the socket 130 prior to the actuation of the detent pin 176 to permit movement of the collet 144 to its binding position, as above described.

Figure 2:
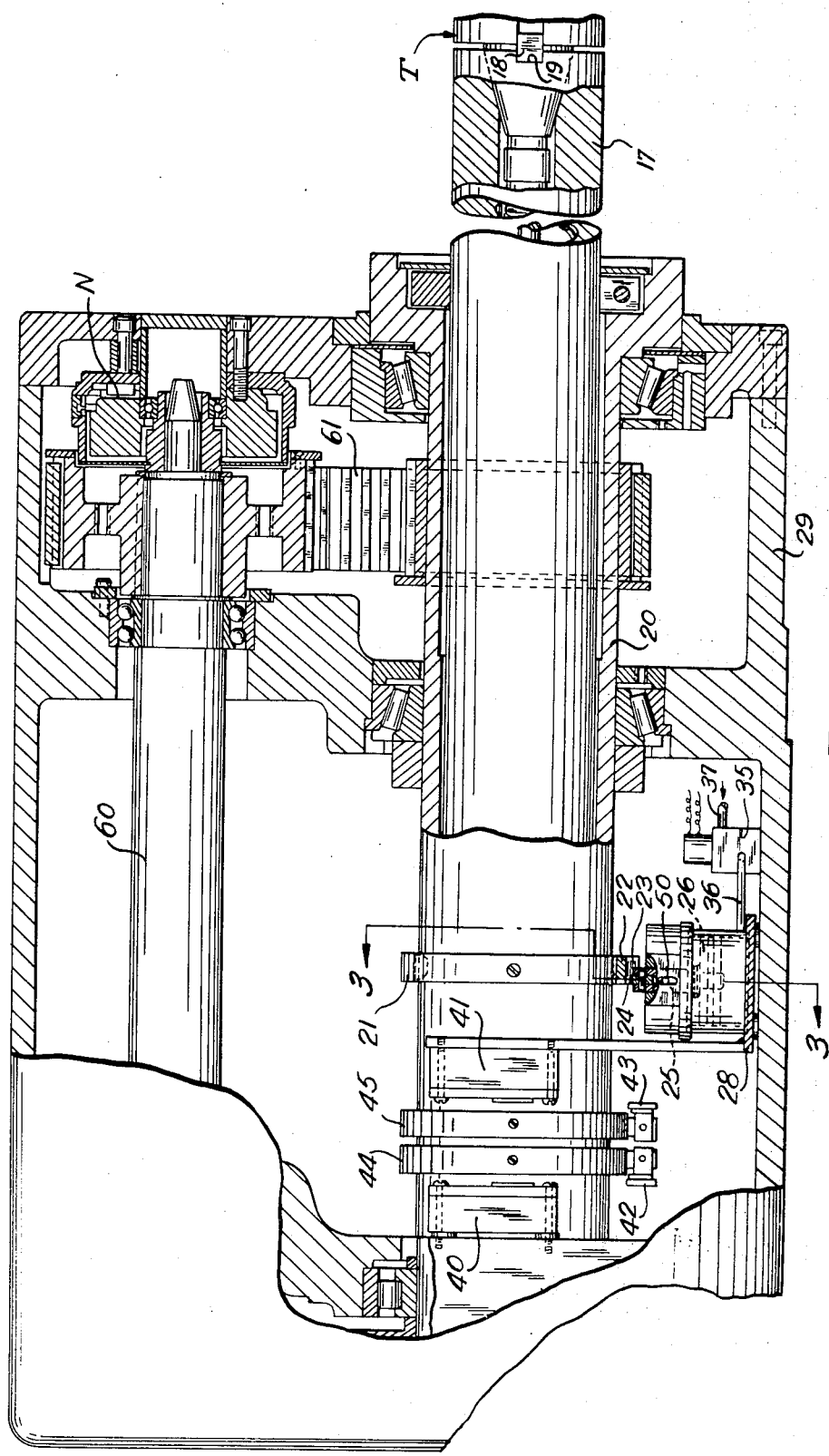
FIG. 2 is a fragmentary front elevational view of the spindlehead of the machine shown in FIG. 1 with parts broken away and in section.
Figure 3:
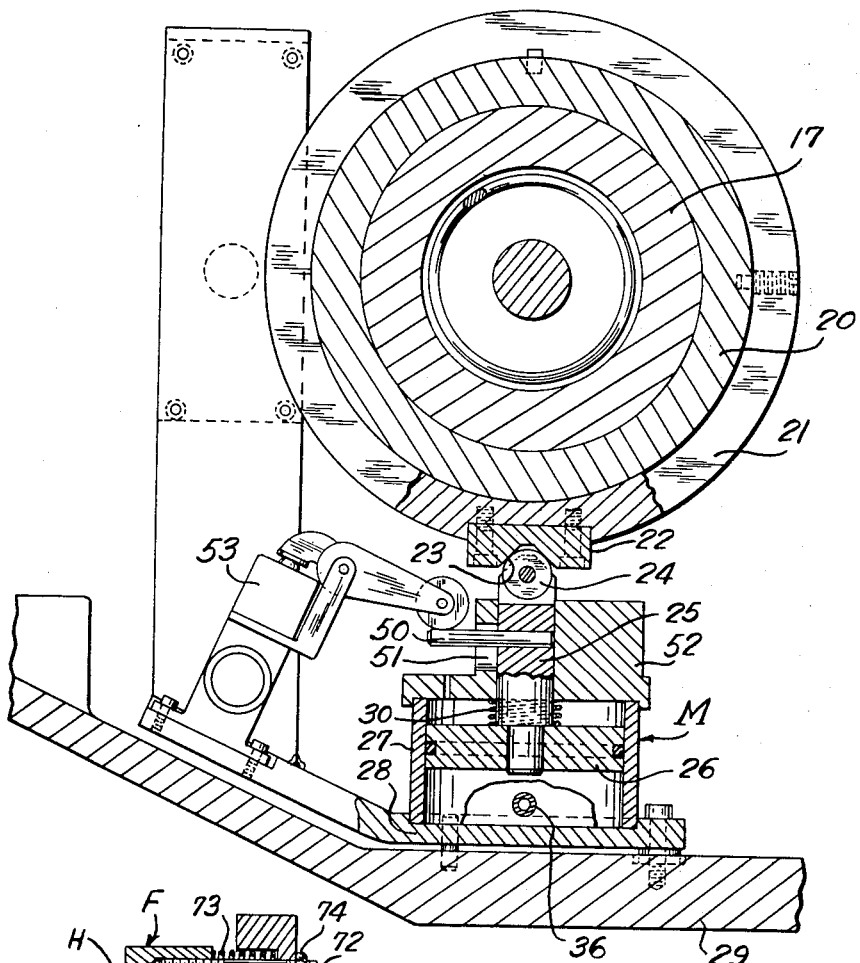
FIG. 3 is a sectional view approximately on line 3—3 of FIG. 2.

For the purpose of stopping the spindle in the same angular position each time its rotation is discontinued prior to depositing and/or picking up a tool, see FIGS. 2 and 3, a spindle quill 20 is provided with a ring 21 fixedly secured thereto and having a block or member 22 fixed thereto provided with a radially outwardly projecting V groove 23 extending lengthwise of the axis of the spindle. The groove 23 is adapted to be selectively engaged by a roller 24 on the upper end of a piston rod or plunger 25 fixedly connected to and projecting upwardly from a piston 26 of a fluid pressure operated motor, designated generally by the reference character M, and comprising a cylinder 27. The cylinder 27 is mounted upon an annular bracket 28 fixedly secured to the inner bottom portion of the spindlehead housing 29. The piston 26 is biased by a spring 30 in a downwardly direction to normally maintain the roller 24 disengaged from the groove 23 carried by the spindle quill. The plunger 25, and in turn the roller 24, is moved in an upwardly direction to engage the roller 24 in the groove 23 by admitting pressure fluid to the end of the cylinder 27 underneath the piston 26.

The flow of pressure fluid to and from the cylinder 27 to engage and disengage the roller 24 with the groove 23 is under the control of a solenoid operated valve 35 (FIG. 2) fixedly secured within the spindlehead adjacent to the cylinder 27 and connected thereto by a conduit 36 and to a source of fluid pressure by conduit means including the conduit 37. The valve 35 is normally closed, that is, in a position to connect a conduit 36 with exhaust and the solenoid thereof is energized to connect the motor M with the source of fluid pressure by a control circuit or means including two magnet-type proximity switches 40, 41, the former of which is connected directly to the spindlehead casting and the latter of which is connected to a projecting arm of the bracket 28, previously referred to.

Figure 9:
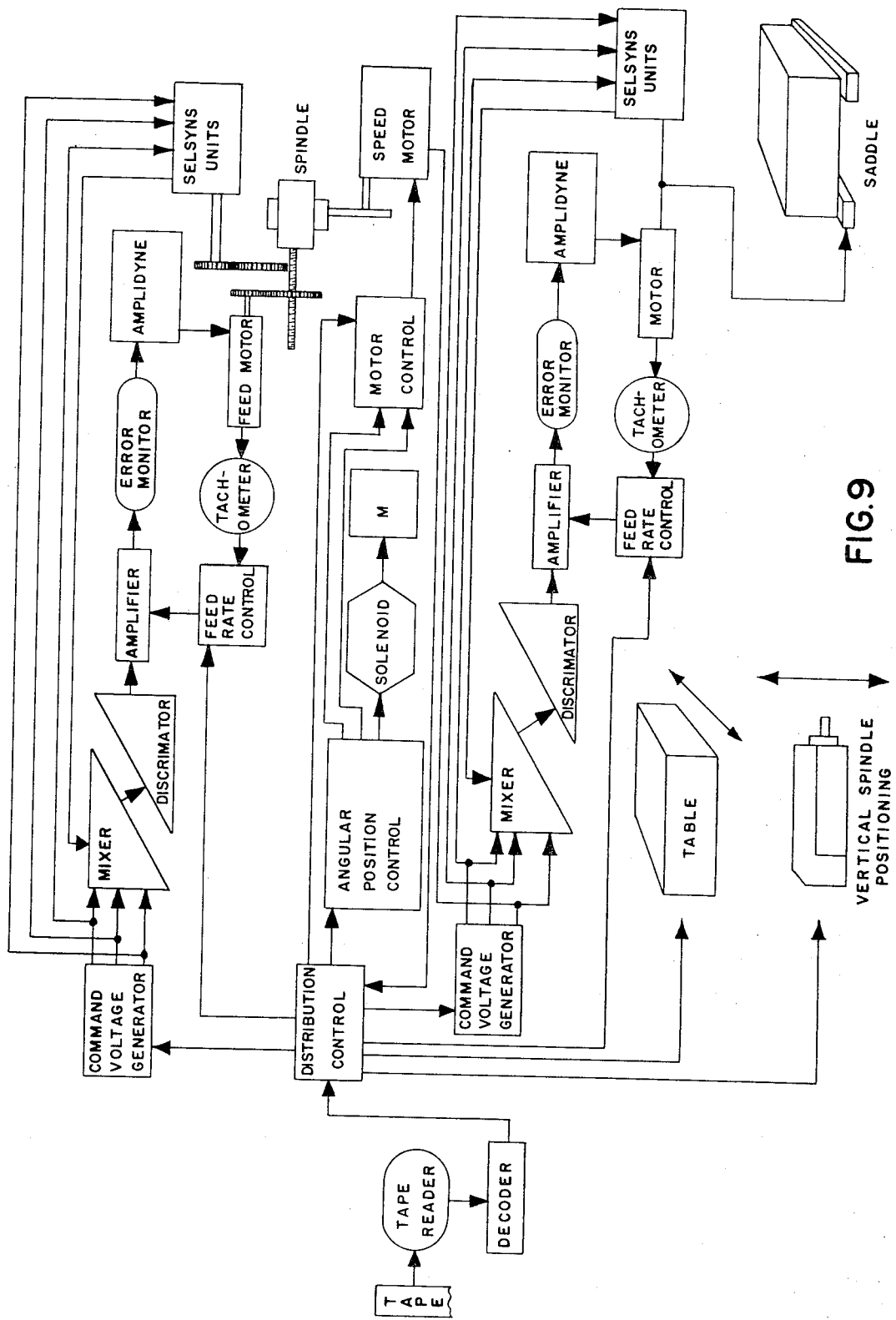
FIG. 9 is a schematic drawing of the numerical control positioning system for the various machine movements.

The control means for stopping the rotation of the spindle in the same angular position each time it is stopped is illustrated schematically in FIG. 9. When a particular machining operation is completed the Distribution Control will send a signal to the Motor Control to substantially reduce the speed of the spindle motor. At the same time the Distribution Control will send a signal to the Angular Position Control. The Angular Position Control contains a suitable circuit having a master switch actuated by the signal from the Distribution Control and a pair of proximity switches 40, 41 which are adapted to be actuated to complete circuits therethrough by permanent magnet means 42, 43 carried by rings 44, 45, respectively, which rings are carried by the spindle quill 20 and adjustable axially thereabout. The master switch is normally open during normal operation of the machine and is closed only after a particular machining operation has taken place. This switch, when closed, enables the proximity switches 40, 41, when actuated by their respective magnets, to complete circuits therethrough. The switch 40 is actuated by the permanent magnet means 42 and sends a signal to the motor control so as to interrupt the spindle drive as by disconnecting the "spindle drive" motor from its source of power and plugging or otherwise breaking it to stop with the groove 23 substantially aligned with the roller 24 carried by the piston rod 25 of the motor M. If the spindle stops, as anticipated, a circuit is completed through the solenoid valve 35 and the piston rod 25 extended to engage the roller 24 in the groove 23. The fact that the groove 23 is V-shaped moves the spindle to the exact desired angular position, if it is not therein when the roller 24 enters the groove, and the roller retains the spindle in the desired position until it is retracted from the groove 23. In the event the spindle has not stopped close enough to the desired position to allow the roller 24 to engage the groove 23, the second proximity switch 41 will be connected in the circuit to send a signal to the spindle drive motor via the Motor Control such that the spindle will rotate until the switch 40 again functions. In other words, the switch 41 and its operating permanent magnet 43 senses the proximity or degree of accuracy with which the spindle stops and effects rotation of the spindle until the predetermined accuracy is attained.

A pin 50 connected to the end of the piston rod 25 projecting above the cylinder 27 of the motor M and extending through a slot 51 in a guide bracket 52 through which the piston rod 25 extends, operates an electric switch 53 connected to the bracket 28 when the roller 24 is properly seated in the groove 23. The switch 53 is in a light circuit which provides a visual signal indicating that the spindle is in proper position for the replacing or picking up of a tool. If more positive means is desired for retaining the spindle in the desired fixed position than that provided by the engagement of the roller 24 in the groove 23, an electrically operated brake or the like may be employed either on the spindle 17 or on a high-speed shaft 60 which drives the spindle through the flexible belt-drive, designated generally as 61. The machine shown incorporates a brake of this character connected to the high-speed shaft 60, which brake is generally designated by the reference character N. Since the particular construction and operation of the brake N forms no part of the present invention it is not illustrated and described in detail.

The combination tool and tool arbors may be similar to those disclosed in the aforementioned Stephan U.S. Pat. No. 2,860,547, and the tool holding devices H in the tool magazine F are each preferably provided with a spring-pressed detent adapted to engage in a hole in each of the arbors or tools. The engagement of these detents in the holes of the respective arbors or tools in the various tool holding devices H prevents the tools from falling out of or changing their angular positions in the tool holding devices of the magazine incident to vibrations, etc. The construction also assures retention of the tools in the tool holding devices upon retraction of the spindle incident to the operation of depositing a tool in the magazine.

Figure 4:
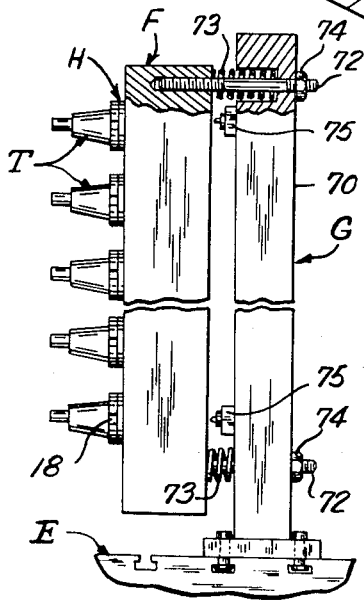
FIG. 4 is a fragmentary end elevational view of the work carrying slide and tool magazine with parts broken away and in section.

As shown in FIG. 4, the tool rack comprises a stand 70 detachably bolted to the table E and having the tool carrying member or magazine F in which the tool devices H are directly supported, connected to the stand 70 for movement relative thereto in a direction parallel to the axis of rotation of the tool spindle 17. As shown, the magazine F is connected to the stand 70 by stud bolts 72 connected to the rear-side thereof, as viewed in FIG. 1, adjacent each of the four corners of the member and projecting rearwardly through suitable apertures in the stand 70. The magazine is biased away from the stand 70 by coil springs 73 surrounding the stud bolt 72 and interposed between the adjacent sides of the stand 70 and the magazine. As shown, the ends of the springs 73, which engage the stand 70, are located in counterbores so as to reduce the overhang of the magazine with respect to the stand. Movement of the magazine F in a direction away from the stand 70 is limited by nuts 74 threaded onto the rearwardly projecting ends of the stud bolts 72. These nuts 74 also provide means for adjusting the magazine F relative to the stand 70. Electric switches 75 located adjacent to the respective corners of the magazine are fixedly secured to the stand 70 in such a manner that their actuating plungers are spaced slightly behind the rear side of the magazine. These switches are connected in series circuit with the main power supply for the machine and shut the machine down in the event that either of them is opened incident to the magazine F being moved towards the stand 70 when a tool is being placed in the magazine or removed therefrom incident to some malfunction of the machine such as an error in the programming.

Any suitable commercially available numerical control system may be employed to coordinate all of the operations of the disclosed machine. While the particular type of control system employed does not form a part of the present invention, FIG. 9 is a schematic block diagram of one suitable numerical control system similar to that shown in General Electric Bulletin No. GET – 2675 entitled "Functional Description of Numerical Position Control," dated March, 1957.

The numerical control position systems for controlling the spindle position and saddle position are identical and are illustrated in FIG. 9. The control systems for positioning the table and the spindlehead vertically on Column B are duplicates of the control systems illustrated for the spindle position and saddle position. The control system for positioning a machine element contains a punched tape which has digital dimensions in simple coded form inscribed thereon. A Tape Reader reads the material on the tape, sends the information read to a Tape Decoder wherein the digital information is converted into electrical signals. The electrical signals are then sent to a Distribution Control which distributes the signals to the various Command Voltage Generators. The Command Voltage Generators generate a command voltage for the position feedback Selsyns, these voltages representing the position which is desired for the machine part to occupy. The feedback Selsyn Units are geared to the lead screws of the movable machine parts and measure the actual position of the machine element. The Selsyn Units transform the position they indicate into a voltage. This voltage is then compared to the command voltage and any difference between the two voltages will produce an output error voltage which is fed back to a Mixer.

Since the data stored in a punched tape is in a decimal code, the Command Voltage Generator generates voltages in increments of 10, i.e., 10, 1, and 0.1. This is accomplished by various transformers and stepping switches (not illustrated). Since each feedback Selsyn is matched by a command voltage representing a decimal part of a number of an increment of 10, it is necessary that a 10 to 1 gear ratio be maintained between successive Selsyns. For example, the lowest speed Selsyn would be geared for one complete revolution per 100 inches of machine travel and would be controlled by a digit representing tens; the second Selsyn, one revolution per 10 inches, controlled by units digit; and a third Selsyn, one revolution per inch, controlled by digits representing tenths and hundreths. In order to have the system position to hundredths of a revolution, an interpolating voltage of one-tenth magnitude is introduced to each Selsyn from the next lower digit. The various Selsyn signals are combined to produce a single signal having the correct sense, indicating the direction of error. The Mixer has specifically designed circuits therein (not shown) to provide a smooth takeover from the coarse Selsyn Units to the fine Selsyn units. For example, the slow speed (100 revolutions) Selsyn has control until it closely corresponds with the command voltage at which time the control is switched to the next higher speed (10 inches revolution) Selsyn, etc. The error signal out of the Mixer is then discriminated in the Discriminator which results in a DC signal of a magnitude and polarity determined by the amount and the direction of the error. The error signal obtained from the Discriminator is proportional to the position error, and establishes the speed and direction at which the Feed Motor is to run. This signal from the Discriminator is compared with the actual speed of the motor as measured by a small Tachometer Generator connected to the Feed Motor. The difference signal is amplified and applied to the control fields of the Amplidyne Generator. The Amplidyne Motor Generator acts as a power amplifier to furnish power to the Feed Motor Armature. The motor will then run at a speed corresponding to the input signal. An Error Monitor is connected to the output of the Discriminator to indicate the magnitude of the position error.

While the preferred embodiment of the invention has been described in considerable detail it will be apparent to those skilled in the art to which it relates that the invention is not limited to a particular type of machine or to the type of machine shown having the particular construction described, and that the invention can be otherwise embodied, for example, the invention is equally applicable to vertically typed boring machines and various types of automatic programing equipment other than punched tapes, such as, punched cards, magnetic tapes, etc.

It is also to be understood that the invention contemplates means other than that shown for yieldably supporting the tool holding devices H and shutting down or stopping the machine and more particularly the relative movements between the tool spindle and the tool magazine in the event of improper contact occurring therebetween.

It is our intention to hereby cover all adaptations, modifications and uses of the invention which come within the practice of those skilled in the art to which it relates and the scope of the appended claims.

Having thus described our invention, what we claim is:

1. In a machine tool, a tool spindle having tool attaching means operable by power to grab or release a tool device, means for selectively rotating said tool spindle, means for stopping said tool spindle in the same predetermined angular position upon discontinuation of its rotation, magazine means having a plurality of compartments each adapted for holding a tool device, means supporting said tool spindle and said magazine means for relative movement both transversely and axially of the axis of rotation of said tool spindle, means for effecting relative movement between said tool spindle and said magazine means transversely of the axis of rotation of said tool spindle to selectively align said tool spindle and one of said compartments in said magazine means, means for effecting relative movement between said tool spindle and said magazine means lengthwise of the axis of rotation of said tool spindle while said tool spindle is aligned with a selected one of said compartments in said magazine means to position said tool spindle adjacent to said selected compartment, and means for actuating said tool attaching means of said tool spindle while adjacent to said selected compartment in said magazine means.

2. In a machine tool, a tool spindle having tool attaching means operable by power to grab or release a tool device, means for selectively rotating said tool spindle, means for stopping said tool spindle in the same predetermined angular position upon discontinuation of its rotation, a work carrier having a work supporting area, magazine means on said work carrier offset from said work supporting area transversely of the axis of rotation of said tool spindle and having a plurality of compartments each adapted for including a tool device, means supporting said tool spindle and said work carrier for relative movement both transversely and axially of the axis of rotation of said tool spindle, means for effecting relative movement between said tool spindle and said work carrier transversely of the axis of rotation of said tool spindle to selectively align said tool attaching means of said tool spindle with one of said compartments in said magazine means, means for effecting relative movement between said tool spindle and said work carrier lengthwise of the axis of rotation of said tool spindle while said tool attaching means is aligned with a selected one of said compartments in said magazine means to position said tool attaching means adjacent to a tool device in said selected compartment, and means for actuating said tool attaching means to grab the tool device in said selected tool compartment in said magazine means.

3. In a machine tool, a tool spindle having tool binding means operable by power to selectively grip and release a tool device, means for selectively rotating said tool spindle, means for stopping said tool spindle in the same predetermined angular position upon discontinuation of its rotation, a work carrier having a work supporting area, a plurality of tool holding means on said work carrier offset from said work supporting area transversely of the axis of rotation of said tool spindle and each adapted to hold a tool device, means supporting said tool spindle and said work carrier for relative movement both transversely and axially of the axis of rotation of said tool spindle, means for effecting relative movement between said tool spindle and said work carrier transversely of the axis of rotation of said tool spindle to selectively align said tool binding means with one of said tool holding means on said work carrier, means for effecting relative movement between said tool spindle and said work carrier lengthwise of the axis of rotation of said tool spindle while said tool binding means is aligned with a selected one of said tool holding means on said work carrier to position an end of a tool device in said tool holding means in said tool spindle, and means for actuating said tool binding means on said tool spindle to grip the tool device in the selected one of said tool holding means while the end of the tool device is in said tool spindle.

4. In a machine tool, an tool spindle having tool binding means operable by power to grab or release a tool device, means for selectively rotating said tool spindle, means for automatically stopping said tool spindle in the same predetermined angular position upon discontinuation of its rotation, a work carrier having a work supporting area, a plurality of tool holding means on said work carrier offset from said work supporting area transversely of the axis of rotation of said tool spindle for supporting a tool device, means supporting said tool spindle and said work carrier for relative movement both transversely and axially of the axis of rotation of said tool spindle, means for automatically effecting relative movement between said tool spindle and said work carrier transversely of the axis of rotation of said tool spindle to selectively align said tool spindle with one of said tool holding means, means for automatically effecting relative movement between said tool spindle and said work carrier lengthwise of the axis of rotation of said tool spindle while aligned with a selected one of said tool holding means to position said tool spindle adjacent to said tool holding means, means for automatically actuating said tool binding means of said tool spindle to release a tool device held thereby while said tool spindle is at the selected one of said tool holding means, means for automatically effecting relative movement between said tool spindle and said work carrier lengthwise of the axis of rotation of said tool spindle to move said tool spindle from adjacent said tool holding means, means for automatically effecting relative movement between said tool spindle and said work carrier transversely of the axis of rotation of said tool spindle to align said tool spindle with another of said tool holding means, means for automatically effecting relative movement between said tool spindle and said work carrier lengthwise of the axis of rotation of said tool spindle while said tool spindle is aligned with said another of said tool holding means to position said tool spindle adjacent to said another of said tool holding means, and means for actuating said tool binding means to grab a tool device in said another of said tool holding means while said tool spindle is at said another of said tool holding means.

5. In a machine tool, a tool spindle having tool attaching means operable to grip or release a tool, means for selectively rotating said tool spindle, means for stopping the rotation of said tool spindle in the same predetermined angular position upon discontinuation of its rotation, magazine means for holding a plurality of tool devices in a predetermined angular position relative thereto, first means for aligning one of a plurality of tool devices in said magazine means with said tool spindle, means for actuating said tool attaching means of said tool spindle while said tool spindle is aligned with said one of said plurality of devices to grip said tool device, means for effecting relative movement between said tool spindle and a workpiece to engage a workpiece with said one of said tool devices, and second means for disengaging said tool attaching means of said tool spindle for facilitating returning said one of said plurality of tool devices to said magazine means in said predetermined angular position in which said one of said plurality of tool devices was held in said magazine means prior to the gripping of said one of said plurality of tool devices by said attaching means of said tool spindle.

6. In apparatus for performing machining operations, a rotatable tool spindle, means for securing a tool engaged with said spindle, means for rotating said spindle, means for stopping said spindle in a single predetermined angular position, means for removably supporting a tool for engagement with said spindle, and power actuated means for producing relative movement between said spindle and said tool support means to engage a tool supported by said support means with said spindle.

7. In apparatus for performing machining operations, a rotatable tool spindle, means for securing a tool with said spindle, means for rotating said spindle, means for stopping said spindle in a single predetermined angular position, means for receiving a tool from said spindle, and power actuated means for producing relative movement between said tool receiving means and said spindle to cause a tool carried by said spindle to be engaged by said tool receiving means.

8. In apparatus for performing machining operations, a rotatable tool spindle,
means for securing a tool engaged with said spindle,
means for rotating said spindle,
means for stopping said spindle in a single predetermined angular position,
means for supporting a tool for engagement with said spindle and for receiving a used tool from said spindle, and
means for producing relative movement of said spindle and said support means during a tool changing operation,
said spindle and said support means being relatively movable toward one another in one part of said tool changing operation to cause a tool carried in said spindle to be returned to said support means and in another part of said tool changing operation to engage a tool supported by said support means with said spindle.

9. Apparatus as claimed in claim 8 wherein said support means comprise a magazine for removably supporting a plurality of tools.

10. In apparatus for performing machining operations with different tools,
a rotatable tool spindle,
means for securing a tool engaged with said spindle,
tool magazine means for removably supporting a plurality of tools in predetermined angular positions,
means for rotating said spindle, and
means for stopping said spindle in a single predetermined angular position for a tool changing operation so that a tool in said spindle can be returned to said magazine means in the same predetermined angular position in which the tool was previously supported therein and so that another tool in said magazine means can be engaged with said spindle in a predetermined angular position.

11. In apparatus for performing machining operations with different tools on a workpiece,
a rotatable tool spindle,
tool storage means for removably supporting a plurality of tools in predetermined angular positions,
means for causing a selected one of said tools to be engaged and gripped with said spindle,
means for effecting relative movement between said spindle and said workpiece to engage the workpiece with said tool;
means for rotating said spindle with the selected tool,
means for stopping the spindle in a single predetermined angular position, and
means for returning the selected tool to said storage means in the same predetermined angular position in which it was previously supported therein.

12. In apparatus for performing machining operations on a workpiece:
a plurality of tools having a member thereon;

a rotatable tool spindle having a complementary member thereon;

tool storage means for removably supporting said plurality of tools;

means for causing a selected one of said tools to be engaged and gripped with said spindle with said member and complementary member in alignment;

means for effecting relative movement between said spindle and said workpiece to engage the workpiece with said tool;

means for rotating said spindle with the selected tool, means for stopping the spindle in a single predetermined angular position and thereby stopping said tool in a known position, and means for returning the selected tool to said storage means.

13. An apparatus for performing machining operations on a workpiece with a plurality of discrete tools, comprising:

a rotatable tool spindle for receiving the tools one at a time;

tool storage means for removably supporting said plurality of tools;

means for causing a selected one of said tools to be engaged with said spindle;

means for rotating said tool spindle and selected tool;

means for stopping the spindle in a single predetermined angular position upon discontinuation of its rotation and thereby stopping the tool in a known position; and means for imparting translational motion to said spindle toward said tool storage means to return said tool to the tool storage means.

14. An apparatus as recited in claim 13 wherein said tool storage means comprises means for positively maintaining the tools in a single annular orientation so that the spindle always receives the tool in the same angular position.

15. An apparatus as recited in claim 13 which further comprises:

means for supporting said workpiece, said means also supporting the tool storage means immediately adjacent to said workpiece.

16. In apparatus for performing machining operations, a tool spindle having tool attaching means operable to grip or release a tool, means for selectively rotating said tool spindle, means for stopping the rotation of said tool spindle in the same predetermined angular position, magazine means holding a plurality of tool devices, means for placing one of said tool devices in said tool spindle, means for actuating said tool attaching means of said tool spindle while said one of said tool devices is in said tool spindle to grip said tool device, means for effecting relative movement between said tool spindle and a workpiece to engage a workpiece with said one of tool devices, and means for returning said one of said tool devices to said magazine means.

17. In apparatus for performing machining operations with different tools:

a power driven tool spindle selectively movable to a plurality of positions and having a rearward end and an operating end;

a tool carrying magazine selectively movable to a plurality of positions for presenting a tool at a predetermined position preparatory to engaging with the spindle any one of the tools in the magazine or returning to the magazine a tool carried in the spindle, and means carried within the spindle for movement between the two ends of the spindle and for cooperating with said magazine to engage with the spindle a tool from the magazine and to release the tool from the spindle to the magazine.

18. In apparatus for performing machining operations with different tools:

a rotatable spindle selectively movable to a plurality of positions;

a tool carrying magazine selectively movable to a plurality of positions for presenting a tool at a predetermined position preparatory to engaging said spindle with a selected tool in said magazine or returning a tool from said spindle to said magazine; and, releasable tool engaging means carried in said spindle for movement relative to said spindle for engaging a selected tool in said magazine and moving it to an operative position in said spindle and for releasing the selected tool from said spindle to said magazine.

19. In apparatus for performing machining operations with different tools:

a power driven rotatable tool spindle selectively movable to a plurality of positions, means for stopping said spindle in a single predetermined angular position, a tool magazine for holding a plurality of tools and being selectively movable to a plurality of positions, means for relatively moving said spindle and said magazine to a predetermined position relative to each other preparatory to placing a selected tool from said magazine into operative engagement with said spindle or returning a tool from said spindle to said magazine, and means movably carried by said spindle for engaging the selected tool and moving it axially into an operating position with said spindle and for releasing a tool from said spindle to said magazine.

20. In apparatus for performing machining operations with different tools:

a power driven rotatable tool spindle, a tool magazine for holding a plurality of tools;

said spindle and said magazine being relatively movable along X, Y and Z axes to a selected position preparatory to securing to said spindle any one of the tools from said magazine or returning a tool from said spindle to said magazine, and means in said spindle for securing thereto a selected tool presented to said spindle by relative movement of said spindle and magazine and for releasing a tool from said spindle to said magazine.

21. In apparatus for performing machining operations:

a rotatable tool spindle;

said spindle comprising releasable tool gripping means operable to grip or release a tool, means for stopping rotation of said spindle in the same predetermined angular position, a tool magazine for holding a plurality of tools, means for relatively moving said magazine and said spindle to a predetermined relative position preparatory to securing in said spindle a selected tool taken from said magazine or returning a tool from said spindle to said magazine, and means for actuating said tool gripping means when said spindle and said magazine are in said predetermined position.

22. In apparatus for performing machine operations, a tool spindle having tool attaching means operable to grip or release a tool, means for selectively rotating said tool spindle, means for stopping the rotation of said tool spindle in the same predetermined angular position upon discontinuation of its rotation, magazine means for holding a plurality of tool devices, means for placing one of the plurality of tool devices in position to be attached to said tool spindle, means for actuating said tool attaching means of said tool spindle with the tool so positioned to grip said tool device, means for effecting relative movement between said tool spindle and a workpiece to engage a workpiece with said one of said tool devices, and means for returning said one of said plurality of tool devices to said magazine means.

23. In apparatus for performing machining operations, a tool spindle having tool attaching means operable to grab or release a tool device, means for selectively rotating said tool spindle, magazine means having a plurality of compartments for holding a tool device, said tool spindle and said magazine means being relatively movable both transversely and axially of the axis of rotation of said tool spindle, means for effecting relative movement between said tool spindle and said magazine means transversely of the axis of rotation of said tool spindle to selectively align said tool spindle and one of said compartments in said magazine means, means for effecting relative movement between said tool spindle and said magazine means lengthwise of the axis of rotation of said tool spindle while said tool spindle is aligned with a selected one of said compartments in said magazine means to position said tool spindle at said selected compartment, and means for causing said tool attaching means of said tool spindle to engage or release a tool device while at said selected compartment in said magazine means.

* * * * *